US012475961B2

(12) United States Patent
Solomon et al.

(10) Patent No.: US 12,475,961 B2
(45) Date of Patent: Nov. 18, 2025

(54) FRACTAL ANALOG RANDOM ACCESS MEMORY

(71) Applicant: International Business Machines Corporation, Armonk, NY (US)

(72) Inventors: Paul Michael Solomon, Westchester, NY (US); Tayfun Gokmen, Briarcliff Manor, NY (US); Sam Storino, Pompano Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/541,598

(22) Filed: Dec. 15, 2023

(65) Prior Publication Data

US 2025/0201323 A1 Jun. 19, 2025

(51) Int. Cl.
*G11C 29/00* (2006.01)
*G11C 7/10* (2006.01)
*G11C 27/02* (2006.01)

(52) U.S. Cl.
CPC .......... *G11C 27/026* (2013.01); *G11C 7/1012* (2013.01); *G11C 7/1069* (2013.01)

(58) Field of Classification Search
CPC ... G11C 11/5642; G11C 27/005; G11C 27/02; G11C 11/5621; G11C 11/5628; G11C 16/0483; G11C 16/28; G11C 2211/5621; G11C 2211/5634; G11C 11/5635; G11C 16/00; G11C 16/10; G11C 16/26; G11C 16/32; G11C 27/026; G11C 7/00; G11C 7/1039; G11C 7/16
See application file for complete search history.

(56) References Cited

U.S. PATENT DOCUMENTS

| 7,302,513 B2 | 11/2007 | Mouttet |
| 7,525,833 B2 | 4/2009 | Snider et al. |
| 7,782,674 B2 | 8/2010 | Roohparvar et al. |

(Continued)

FOREIGN PATENT DOCUMENTS

| CN | 107924227 B | 6/2021 |
| DE | 112016003245 T5 | 4/2018 |

(Continued)

OTHER PUBLICATIONS

Frontiers in neuroscience Acceleration of Deep Neural Network Training with Resistive Cross-Point Devices: Design Considerations Tayfun Gokmen and Yurii Vlasov IBM T.J. Watson Research Center, Yorktown Heights, NY, USA Front. Neurosis., Jul. 21, 2016 pp. 1-13.

(Continued)

*Primary Examiner* — Thong Q Le
(74) *Attorney, Agent, or Firm* — Tutunjian & Bitetto, P.C.; Kimberly Zillig (57) ABSTRACT

A memory device that includes a plurality of memory cells including sample capacitors and hold capacitors in an array geometry; a readout transistor in electrical communication with the sample capacitors and hold capacitors; and a peripheral amplifier. The memory device further includes an analog multiplexer that controls digital and analog signal to the array of memory cells to provide for random access of the memory cells. The read transistor provides a single source follower transistor for each memory cell of the plurality of memory cells to the peripheral amplifier.

20 Claims, 7 Drawing Sheets

(56) References Cited

U.S. PATENT DOCUMENTS

| | | | |
|---|---|---|---|
| 7,827,130 B2 | 11/2010 | Nugent et al. | |
| 7,902,867 B2 | 3/2011 | Mouttet | |
| 8,000,789 B2* | 8/2011 | Denison | G01D 5/24 |
| | | | 324/76.38 |
| 9,041,389 B2 | 5/2015 | Gokmen et al. | |
| 9,152,827 B2 | 10/2015 | Linderman et al. | |
| 9,203,022 B2 | 12/2015 | Hopstaken et al. | |
| 9,389,273 B2 | 7/2016 | Gokmen et al. | |
| 9,400,306 B2 | 7/2016 | Gokmen et al. | |
| 9,443,997 B2 | 9/2016 | Gokmen et al. | |
| 9,601,546 B1 | 3/2017 | Ando et al. | |
| 9,608,160 B1 | 3/2017 | Bayram et al. | |
| 9,646,243 B1 | 5/2017 | Gokmen | |
| 9,659,249 B1 | 5/2017 | Copel | |
| 9,715,656 B1 | 7/2017 | Gokmen | |
| 9,779,355 B1 | 10/2017 | Leobandung | |
| 9,852,790 B1 | 12/2017 | Gokmen et al. | |
| 9,887,351 B1 | 2/2018 | Ando et al. | |
| 9,997,704 B2 | 6/2018 | Ando et al. | |
| 10,079,341 B1 | 9/2018 | Bedell et al. | |
| 10,096,773 B1 | 10/2018 | Ando et al. | |
| 10,115,800 B1 | 10/2018 | Kim et al. | |
| 10,141,509 B2 | 11/2018 | Ando et al. | |
| 10,153,159 B1 | 12/2018 | Kim et al. | |
| 10,186,657 B2 | 1/2019 | Brew et al. | |
| 11,494,464 B1 | 11/2022 | Agarwal et al. | |
| 2009/0103365 A1 | 4/2009 | Roohparvar et al. | |
| 2010/0122103 A1* | 5/2010 | Roohparvar | G11C 5/066 |
| | | | 713/400 |
| 2011/0153533 A1 | 6/2011 | Jackson et al. | |
| 2012/0084241 A1 | 4/2012 | Friedman et al. | |
| 2014/0156576 A1 | 6/2014 | Nugent | |
| 2014/0172937 A1 | 6/2014 | Lnderman et al. | |
| 2015/0170025 A1 | 6/2015 | Wu et al. | |
| 2015/0171868 A1 | 6/2015 | Rodriguez et al. | |
| 2016/0293232 A1 | 10/2016 | Ishizu et al. | |
| 2017/0109626 A1 | 4/2017 | Gokmen et al. | |
| 2017/0109628 A1 | 4/2017 | Gokmen et al. | |
| 2018/0005110 A1 | 1/2018 | Gokmen et al. | |
| 2018/0089559 A1 | 3/2018 | Copel | |
| 2022/0114133 A1 | 4/2022 | Liu et al. | |

FOREIGN PATENT DOCUMENTS

| | | | |
|---|---|---|---|
| GB | 2559915 B | 2/2020 | |
| JP | H05-181993 A | 7/1993 | |
| JP | H05-282272 A | 10/1993 | |
| JP | H07-121498 A | 5/1995 | |
| JP | H07-319507 A | 12/1995 | |
| JP | 2013-546064 A | 12/2013 | |
| JP | 2019-502970 A | 1/2019 | |
| WO | 2017/068443 A1 | 4/2017 | |
| WO | 2022226721 A1 | 11/2022 | |
| WO | 2023046001 A1 | 3/2023 | |

OTHER PUBLICATIONS

IEEE Xplore A CMOS Spiking Neuron for Brain-Inspired Neural Networks With Resistive Synapses andIn SituLearning Published in: IEEE Transactions on Circuits and Systems II: Express Briefs (vol. 62, Issue: 11, Nov. 2015) Xinyu Wu; Vishal Saxena; Kehan Zhu; Sakkarapani Balagopa pp. 1088-1092 IEEE.

Kateva et al., "Efficient training algorithms for neural networks based on memristive crossbar circuits.", International Joint Conference on Neural Networks (IJCNN), IEEE, 2015, Year 2015, pp. 1-8.

NANO Letters Nanoscale Memristor Device as Synapse in Neuromorphic Systems, Sung Hyun Jo, Ting Chang, Idongesit Ebong, Bhavitavya B. Bhadviya, Pinaki Mazumder, and Wei Lu Department of Electrical Engineering and Computer Science, University of Michigan, Michigan 48109 pp. 1297-1301.

Nature communications Pattern classification by memristive crossbar circuits using ex situ and in situ training Fabien Alibart, Elham Zamanidoost & Dmitri B. Strukov | Accepted May 29, 2013 | Published Jun. 25, 2013 pp. 1-7.

ScienceDirect Elsevier Neurocomputing vol. 74, Issues 1-3, Dec. 2010, pp. 239-255 Artificial neural networks in hardware: A survey of two decades of progress Janardan Misra, Indranil Saha.

Tayfun Gokmen et al., "Resistive Processing Unit", U.S. Appl. No. 14/887,564, filed Oct. 20, 2015.

Tayfun Gokmen, "Convolutional Neural Networks Using Resistive Processing Unit Array", U.S. Appl. No. 15/262,606, filed Sep. 12, 2016.

Tayfun Gokmen, "Killing Asymmetric Resistive Processing Units for Neural Network Training", U.S. Appl. No. 15/262,582, filed Sep. 12, 2016.

United States Non-Final Rejection dated Jun. 6, 2018, 9 pages, in U.S. Appl. No. 14/887,564.

United States Non-Final Rejection dated Sep. 26, 2018, 13 pages, in U.S. Appl. No. 14/966,394.

United States Notice of Allowance dated Mar. 25, 2019, 5 pages, in U.S. Appl. No. 14/966,394.

United States Notice of Allowance dated Nov. 21, 2018, 5 pages, in U.S. Appl. No. 14/887,564.

Anonymous, "Common drain", Wikipedia, XP93239286, May 25, 2021, pp. 1-2.

International Searching Authority, "Notification of Transmittal of the International Search Report and the Written Opinion of the International Searching Authority, or Declaration," Patent Cooperation Treaty, Feb. 6, 2025, 14 pages, International Application No.—PCT/ IB2024/060850.

Chippa et al., "StoRM: a stochastic recognition and mining processor," 2014 International Symposium on Low Power Electronics And Design, Aug. 11, 2014, pp. 39-44.

Chua Leon., "Resistance switching memories are memristors," Applied Physics A, vol. 102, No. 4, Mar. 2011, pp. 765-783.

Hamdioui et al. "Memristor for computing: myth or reality?", Proceedings of the Conference on Design, Automation & Test in Europe, : Mar. 27, 2017, pp. 722-731.

Indiveri et al. "Integration of nanoscale memristor synapses in neuromorphic computing architectures Giacomo", Nanotechnology, Sep. 2013, pp. 1-14.

Intellectual Property Office, Patents Act 1977: Examination Report, Jul. 17, 2018, 4 Pages, GB Application No. GB1807583.8.

Kim et al. "Analog CMOS-based Resistive Processing Unit for Deep Neural Network Training", Computer Science > Emerging Technologies, Jan. 20, 2017, pp. 1-4.

Lehmann et al., "A Generic Systolic Array Building Block For Neural Networks with On-Chip Learning," IEEE Transactions on Neural Networks, vol. 4, No. 3, May 1993, pp. 400-407.

Li et al., "Training itself: Mixed-signal training acceleration for memristor-based neural network," 19th Asia and South Pacific Design Automation Conference (ASP-DAC), Jan. 2014, pp. 361-366.

Pershin et al., "Solving mazes with memristors: A massively parallel approach," Physical Review E, vol. 84, No. 4, Jul. 2011, 6 pages.

Soudry et al., "Memristor-Based Multilayer Neural Networks With Online Gradient Descent Training," IEEE Transactions On Neural Networks And Learning Systems, Oct. 2015, 14 pages.

\* cited by examiner

FRACTAL ANALOG RANDOM ACCESS MEMORY

BACKGROUND

The methods and structures described herein relate in general to configurations of memory. More particularly, the present description relates to memory cells including sample and hold capacitors in an array configuration.

Analog computing is a match for training of artificial intelligence (AI) neural networks, because of the fairly low precision that is acceptable in this application, while high speed, high parallelism, and low power are of higher importance. Examples of hardware algorithms to exploit these features are found in the form of a resistive processing unit (RPU). These architectures efficiently perform matrix-vector multiplication (Matvec) and outer product (update) functions.

SUMMARY

In one aspect, a memory device is provided. In one embodiment, the memory device includes a plurality of memory cells including sample capacitors and hold capacitors in an array geometry. The memory device also includes a readout transistor in electrical communication with the sample capacitors and hold capacitors. The memory device further includes a peripheral amplifier. The memory device can also include an analog multiplexer that controls digital and analog signal to the array of memory cells to provide for random access of the memory cells. The read transistor provides a single source follower transistor for each memory cell of the plurality of memory cells to the peripheral amplifier.

In some embodiments, a memory device is provided that includes a plurality of memory cells including sample capacitors and hold capacitors in an array geometry that includes a rational number of subunits (R×C), each subunit having its own peripheral amplifier and analog to digital converter, wherein the array geometry includes R subunits along each row and C subunits along each column in the array geometry, wherein a degree of parallelism allows read throughput to be increased by a factor of R for reading entire rows or C when reading entire columns. The memory device may further include a readout transistor in electrical communication with the sample capacitors and hold capacitors. The memory device can further include a peripheral amplifier. The memory device can also include an analog multiplexer that controls digital and analog signal to the array of memory cells to provide for random access of the memory cells, wherein the read transistor provides a single source follower transistor for each memory cell of the plurality of memory cells to the peripheral amplifier.

In yet another embodiment, a memory device is provided that includes a plurality of memory cells including unit cells in an array geometry, wherein the unit cells in the array are differential with two sample capacitors and two hold capacitors. The memory device includes a readout transistor in electrical communication with the two sample capacitors and the two hold capacitors. The memory device may also include a peripheral amplifier. The memory device can also include an analog multiplexer that controls digital and analog signal to the array of memory cells to provide for random access of the memory cells, wherein the read transistor provides a single source follower transistor for each memory cell of the plurality of memory cells to the peripheral amplifier.

BRIEF DESCRIPTION OF THE DRAWINGS

The following description will provide details for some embodiments of resistive processing units with reference to the following figures wherein.

DETAILED DESCRIPTION

Detailed embodiments of the claimed structures and methods are described herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present description. For purposes of the description hereinafter, the terms "upper", "lower", "right", "left", "vertical", "horizontal", "top", "bottom", and derivatives thereof shall relate to the embodiments of the disclosure, as it is oriented in the drawing figures. The terms "positioned on" means that a first element, such as a first structure, is present on a second element, such as a second structure, wherein intervening elements, such as an interface structure, e.g., interface layer, can be present between the first element and the second element. The term "direct contact" means that a first element, such as a first structure, and a second element, such as a second structure, are connected without any intermediary conducting, insulating or semiconductor layers at the interface of the two elements.

Artificial intelligence (AI) neural networks, and models based thereon, have made progress in part due to the availability of large, labeled datasets and continuous improvements in computation resources. Some of these can exceed human level performance on various tasks such as object/speech recognition, language translation and image captioning. Since the quality of the models depends on large amount of training data and increased complexity of the neural network, training remains a bottleneck.

Deep neural network (DNN) training generally relies on the backpropagation algorithm which is composed of three repeating cycles: forward, backward and weight update. In some examples, crossbar array of resistive processing unit (RPU) devices can perform all three cycles of the backpropagation algorithm in parallel. More particularly, the backpropagation algorithm is composed of three cycles, forward, backward, and weight update that are repeated many times until a convergence criterion is met. The forward and backward cycles mainly involve computing vector-matrix multiplication in forward and backward directions.

This operation can be performed on a 2D crossbar array of two-terminal resistive devices, e.g., crossbar array of resistive processing unit (RPU) devices. In forward cycle, stored conductance values in the crossbar array form a matrix, whereas the input vector is transmitted as voltage pulses through each of the input rows. In a backward cycle, when voltage pulses are supplied from columns as an input, then the vector-matrix product is computed on the transpose of a matrix.

Complementary metal oxide semiconductor resistive processing units (CMOS-RPU) can perform vector-matrix multiply and outer product updates. Vector-matrix multiply can be employed to read the values stored in RPU arrays. This can be a very slow process. Therefore, in some methods, this operation is intentionally avoided, while designing algorithms.

Reading RPU (CMOS-RPU) values efficiently and fast, which can open new venues. In some examples, the outer-product updates can be used as a General Matrix-Matrix Multiply Engines. This can included to: 1) reset the array; 2) implement Matrix-Matrix multiplication as a series of outer products; and 3) read the results stored in RPUs.

Matrix multiplication, which involves multiplying two rectangular arrays of numbers, is often found at the heart of speech recognition, image recognition, smartphone image processing, compression, and generating computer graphics. Matrix multiplication, also known as matrix product and the multiplication of two matrices, produces a single matrix. It is a type of binary operation. If A and B are the two matrices, then the product of the two matrices A and B are denoted by: X=AB.

In some embodiments, the methods, systems and structures of the present disclosure provide a fractal analog random access memory device that can overcome the aforementioned disadvantages. A "fractal" is any geometric pattern that occurs again and again, at different sizes and scales, within the same object. Digital memory stores data in binary format, using only two states (1 and 0) to represent information. Analog memory, on the other hand, stores information in a continuous format, using a range of values to represent information. Random Access Memory (RAM) is organized and controlled in a way that enables data to be stored and retrieved directly to and from specific locations.

The methods, systems and computer program products described herein use fractal analog random access memory that has the ability to quickly read a large analog array of voltages in arbitrary order and thus includes a solution to the matrix-matrix multiply problem. More generally, the methods, systems and computer program products described herein use fractal analog random access memory provides the means to rapidly and economically extract the voltage values stored in a large array of capacitors.

Figure 1:
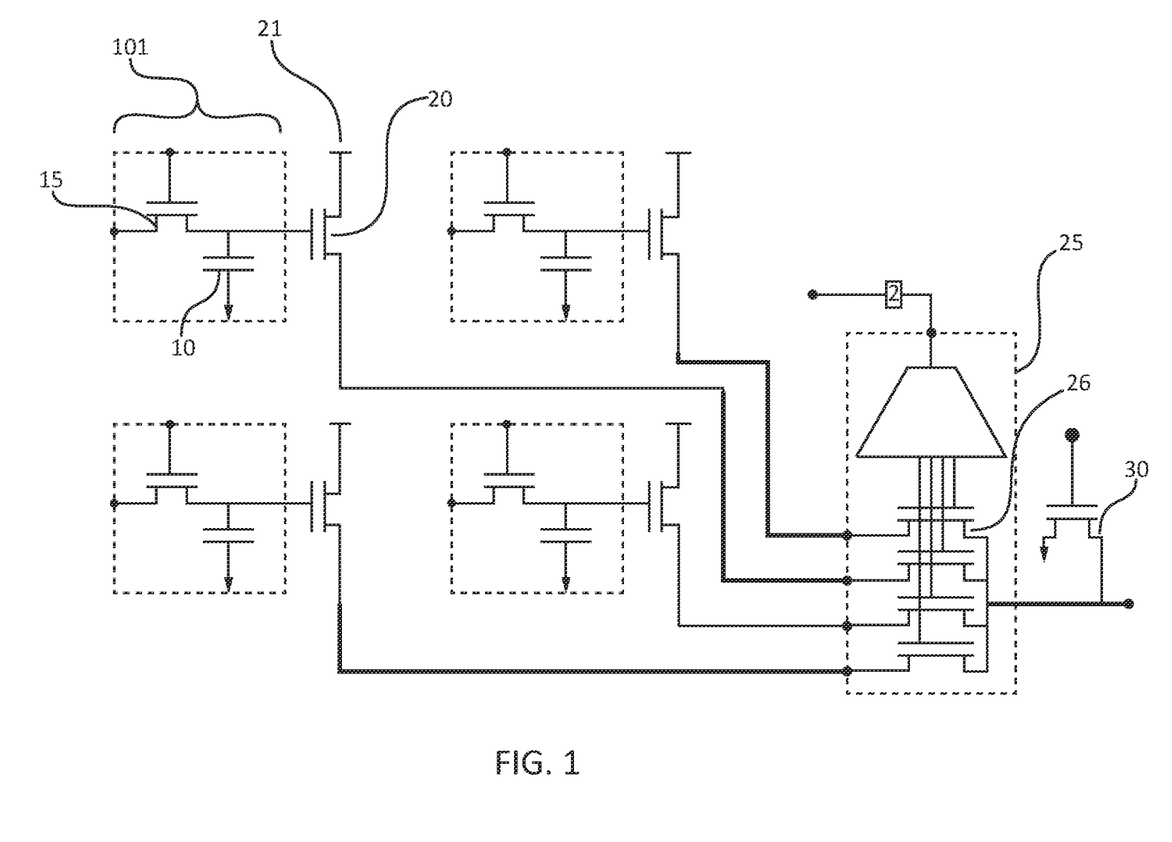
FIG. 1 is a circuit diagram that illustrates one embodiment of an N×N array of sample capacitors and hold capacitors, readout and bias transistors with an analog multiplexer, in accordance with one embodiment of the present disclosure.

FIG. 1 is a circuit diagram that illustrates one embodiment of an N×N array of sample capacitors and hold capacitors 10, 15, readout transistor 20 and bias transistors 30 with an analog multiplexer 25, in accordance with one embodiment of the present disclosure. In some embodiments, the readout transistor 20 provides a single source follower read field effect transistor (FET) per unit cell that allows transmission of sample and hold capacitor voltage to peripheral amplifier without loss, with minimal impact on cell size.

As used herein, the term "capacitor" denotes a structure including two electrically conductive materials, i.e., electrodes, separated and insulated from each other by a dielectric, i.e., node dielectric layer, for storing a charge. The term "electrode" as used to describe a component of the capacitor represents one of the two electrically conductive materials of the capacitor that are separated by the dielectric layer. A "node dielectric layer" is the dielectric layer that is present between the electrodes of the capacitor.

Figure 2:
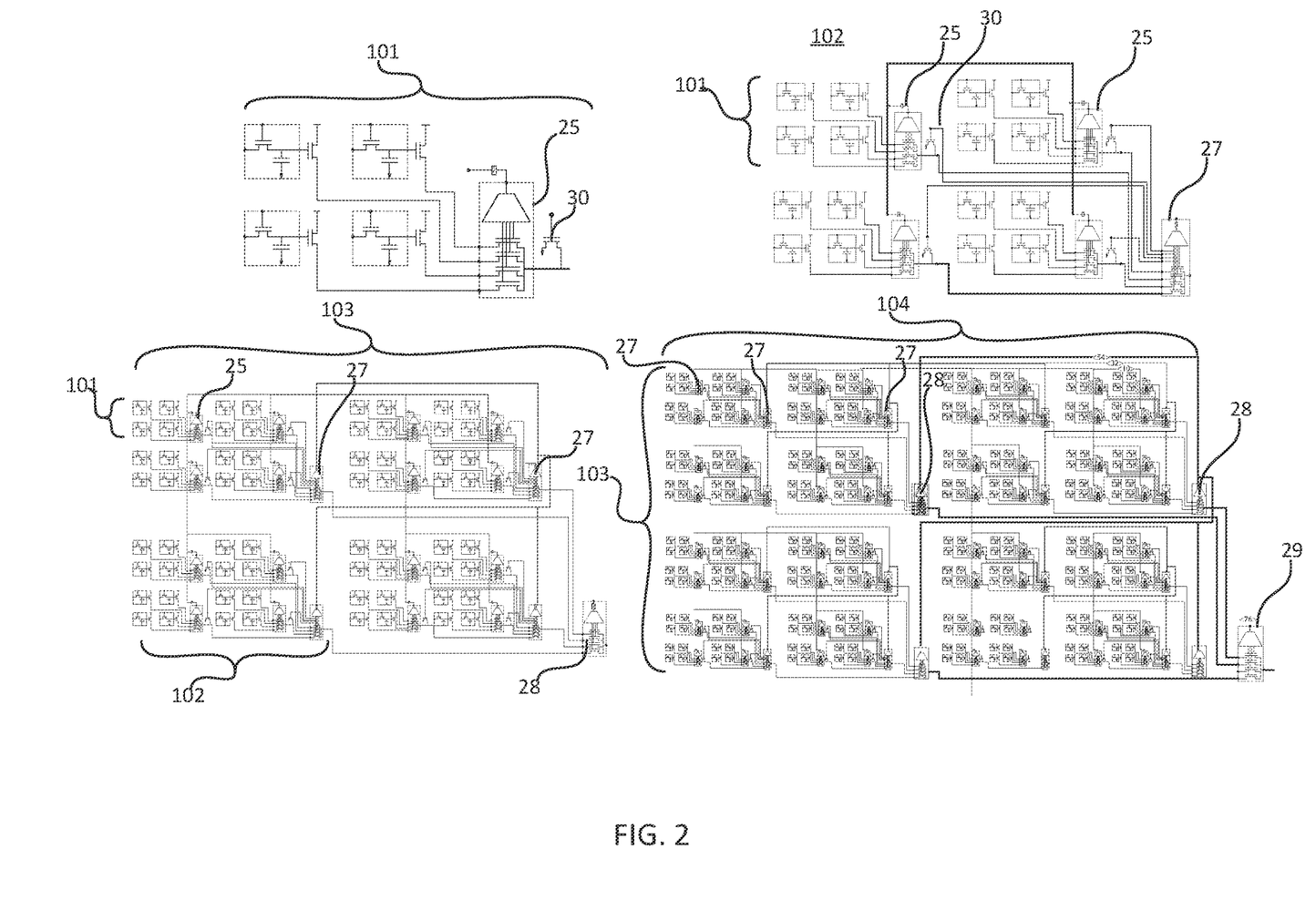
FIG. 2 are circuit diagrams comparing 2×2 array, 4×4 array, 8×8 array and 16×16 array to illustrate fractal upscaling, in accordance with some embodiments of the present disclosure.

It is noted that the array depicted in FIG. 1 is a 2×2 array, however any array configuration may be employed. For example, FIG. 2 illustrates how fractal scaling can provide that the array be configured in a 2×2 array 101, a 4×4 array 102, an 8×8 array 103 and a 16×16 array 104. As will be described in further detail below, the designs described herein can enable the organization of a large array into a rational number, R×C, of sub-units, each unit having its own peripheral amplifier 7 and analog to digital converter (ADC) 8. There can be R sub units along each row and C sub-units along each column. This degree of parallelism allows the read throughput to be increased by a factor of R for reading entire rows or C when reading entire columns.

Referring back to FIG. 1, the unit cell is identified as reference number 101, and in this example is a 2×2 unit cell. The sampling capacitor (Cs) is identified by reference number 10. The hold capacitor is identified by reference number 15. A sample and hold circuit is an analog device that takes the voltage of a continually changing analog signal and holds it at a consistent level for a set amount of time. In a sample and hold circuit, a capacitor holds an electric charge, i.e., the hold capacitor 15, and at least one switching device, such as a field effect transistor switch, and generally one op-amp are added (operational amplifier). When the switch closes, the capacitor charges up to, or discharges down to the input voltage. This is the sampling function of the sample capacitor 10.

Referring to FIG. 1, each unit cell 101 includes a read-out transistor (Qr) 20, which can provide the switching device for the unit cell 101. When a specific charge is stored in the unit cell, that can trigger the read-out transistor (Qr) to switch.

Referring to FIG. 1, the N×N array 101 may be in communication through the read-out transistor (Qr) to a multiplexer 25. In analog circuit design, a multiplexer is a special type of analog switch that connects one signal selected from several inputs to a single output. In the example, which is depicted in FIG. 1, the multiplexer is a 4:1 (4-to-1) multiplexer. A 4:1 multiplexer can take 1 input and directs a single selected input to output. The selection of input is controlled by selection inputs. In some embodiments, a 4-way decoder/analog multiplexer provides access to 2×2 units, where the units increase geometrically in size from unit cells to ¼ of the entire array. This progression gives the overall device a fractal structure.

In the embodiment depicted in FIG. 1, the multiplexer identified by reference number 25 is in electrical communication to the cells of the array through the read out transistors (Qr) 20 for the input to the multiplexer 25, and the single output of the 4:1 multiplexer is in electric communication with a bias transistor (Qb) 30. The multiplexer 25 that is depicted in FIG. 1 includes four multiplexer transistors (Qm) 26, in which each of the four multiplexer transistors are connected to one read-out transistor (Qr) 20 from one of the four cells 101 in the 2×2 array. The multiplexer transistors (Qm) 26 are low leakage MOSFETs. Low leakage MOSFETs in analog multiplexers allow transmission of redout voltage to the edges of the array without any loss. A metal-oxide-semiconductor field-effect transistor (MOSFET, MOS-FET, or MOS FET) is a type of field-effect transistor (FET), which can be fabricated by having a gate dielectric that is an oxide. It has an insulated gate, the voltage of which determines the conductivity of the device. This ability to change conductivity with the amount of applied voltage can be used for amplifying or switching electronic signals. As used herein a "field effect transistor" is a transistor in which output current, i.e., source-drain current, is controlled by the voltage applied to the gate. A field effect transistor has three terminals, i.e., gate structure, source region and drain region. A "gate structure" means a structure used to control output current (i.e., flow of carriers in the channel) of a semiconducting device through electrical or magnetic fields. As used herein, the term "drain" means a doped region in semiconductor device located at the end of the channel, in which carriers are flowing out of the transistor through the drain. As used herein, the term "source" is a doped region in the semiconductor device, in which majority carriers are flowing into the channel. As noted, the MOSFETs for the multiplexer have minimized leakage current. These are leakage currents that flow between the respective pins when the gate of the MOSFET is in an off state.

In FIG. 1, the bias voltage is depicted as Vb having reference number 21.

Figure 3:
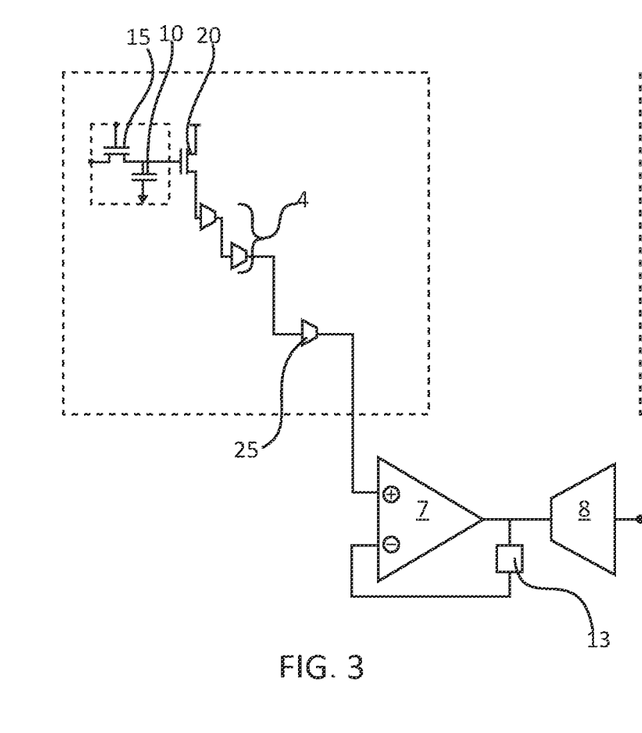
FIG. 3 is a circuit diagram of a unit cell for fractal analog random access memory illustrating an analog array connected to an operational amplifier (Op-amp) and to provide for offset compensation, in accordance with one embodiment of the present disclosure.

FIG. 3 illustrates one example of an analog array, which can provide further details for unit cell for the N×N array 101 described with reference to FIG. 1. The unit cell 101 includes the hold capacitor 10 and sense capacitor 5, as well as the read out transistor 20. Each of these elements have been described above with reference to FIG. 1. Referring back to FIG. 3, from the read out transistor 20, the analog array also includes a double binary 2-D distribution tree 4 to an analog multiplexer 25. In this example, the analog multiplexer 25 is also in electrical communication with an offset compensation circuit. The offset compensation circuit may include an op amp 7 and an analog to digital converter (ADC) 8. The op amp 7 can amplify and shape an analog signal before being sent to an analog to digital converter (ADC) to convert the analog signal to a digital signal. An operational amplifier (op amp) 7 can be an analog circuit block that takes a differential voltage input and produces a single-ended voltage output. Op amps can have three terminals: two high-impedance inputs and a low-impedance output port. The inverting input is denoted with a minus (−) sign, and the non-inverting input uses a positive (+) sign. Operational amplifiers work to amplify the voltage differential between the inputs.

In the embodiments depicted in FIG. 3, the single peripheral op-amp 7 and the analog to digital converter (ADC) 8 provide a read out for an entire array, e.g., as depicted in the array, e.g., 2×2, 4×4, 8×8 and 16×16, as depicted in FIG. 2. In some embodiments, the designs herein provide remote placement of operational amplifier transistors with one in the unit cells and the others in the peripheral amplifier, shared with random access among all the unit cells. Inclusion of an analog to digital convertor (ADC) is also provided in tandem with the amplifier.

In some embodiments, as depicted in FIG. 3, the composition circuit in op-amp 7 compensates for voltage loss in the readout transistor and bias circuit.

Figure 4:
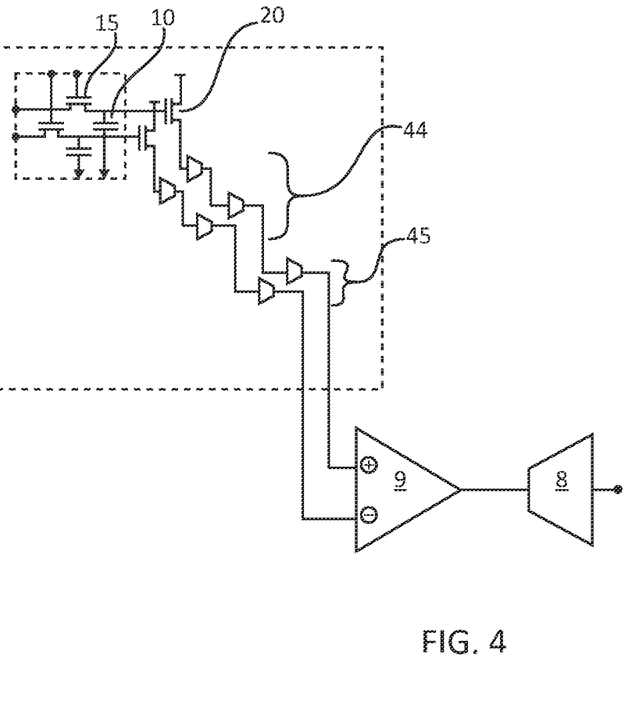
FIG. 4 is a circuit diagram of another embodiment of a unit cell for fractal analog random access memory illustrating a differential mode embodiment of the present disclosure.

FIG. 4 illustrates another example of an analog array, which can provide further details for unit cell for the N×N array 101 described with reference to FIG. 1. The embodiment depicted in FIG. 4 illustrates a differential mode embodiment. The differential unit cell depicted in FIG. 4 includes two differential unit cells and two sampling capacitors 15. Further, there are two read out transistors 20, one being in electrical communication with each unit cell. There are two sets of differential wiring 45 and multiplexers 45. In comparison to the unit cell depicted in FIG. 3 that includes an operation amp (OP Amp), the embodiment depicted in FIG. 3 includes a differential amp 9 and an analog to digital converter (ADC) 8. A differential amplifier is a type of an operational amplifier. In some examples, while general purpose of an op-amp is to amplify weak signal into strong signal and differential amplifier only just amplifies the difference between two input voltages of the two differential unit cells. (no difference-no amplification).

FIG. 4 depicts an alternate embodiment, in which the unit cells are differential with two sample and hold capacitors and read transistors. The differential configuration allows higher accuracy and common-mode rejection in transmitting the signal to the periphery. The differential signal also allows for simplification of the peripheral amplifier. Each leg of the differential path is independent of the other including multiplexers and bias networks although, of course they share the same peripheral amplifier.

Figure 5:
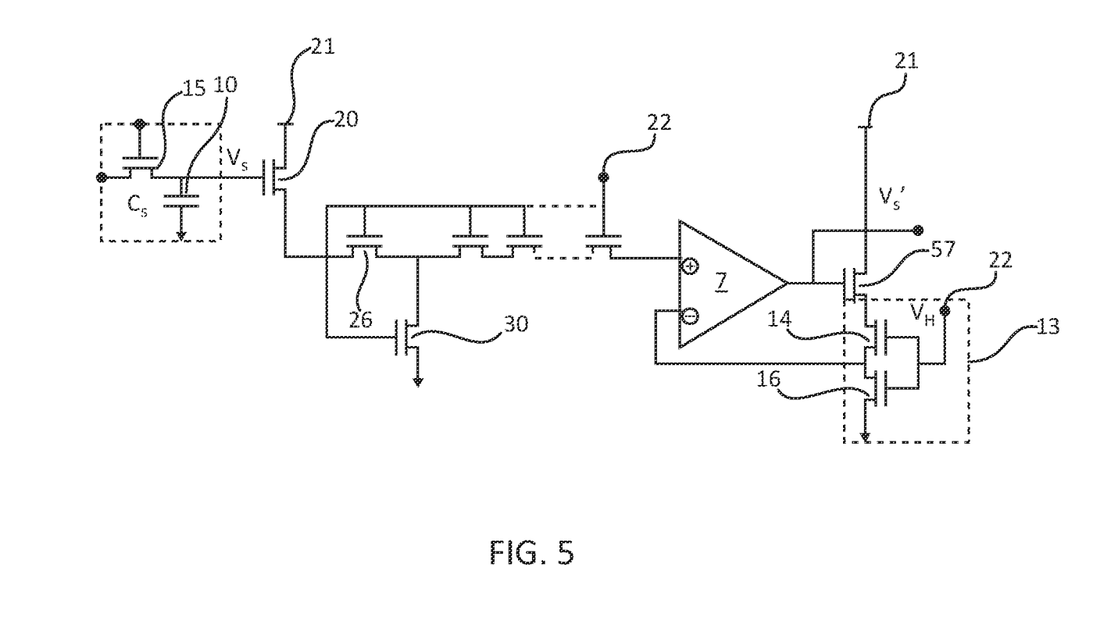
FIG. 5 is a circuit diagram illustrating one embodiment of a read critical path operation in a fractal analog random access memory device, in accordance with one embodiment of the present disclosure.

FIG. 5 is a circuit diagram illustrating one embodiment of a read critical path operation in a fractal analog random access memory device. Readout and charge accumulation in sampling capacitors can be done simultaneously. FIG. 5 illustrates a cell 101 including hold capacitors and sampling capacitors 10, 15. The read voltage Vs is read through a read out transistor 20.

FIGS. 1-4 illustrate some example of the fractal nature of the of a double binary distribution tree 4, 44 that provides access to the whole array with a logarithmic space penalty on size of the array.

Referring to FIG. 2, fractal scaling is depicted in which the 2×2 array that has been described above with reference to FIG. 1 is identified by reference number 101.

The 4×4 array having reference number 102 includes 4 of the 2×2 array. This results in 16 unit cells of hold and sample capacitors 10, 15, as well as 16 read-out transistors (Qr) 20. Each unit cell of hold and sample capacitors 10, 15 has its own multiplexer 25, e.g., each multiplexer 25 having four multiplexer transistors 26 (Qm), and bias transistor 30 (Qb), which is in electrical communication with a 4×4 cell multiplexer 27, which also has four multiplexer transistors (Qm). The 4×4 cell multiplexer 27 (hereafter referred to as 4×4 cell periphery multiplexer) in electric electrical communication with the single output of each of the four multiplexer transistors of the multiplexer for the 2×2 cell, and the 4×4 cell multiplexer 27 is in electrical communication with the bias transistors (Qb) of the multiplexer 25 for the 4×4 cells.

The 8×8 cell 103 includes 4 of the 4×4 cells 102, which results in 32 unit cells of the hold and sample capacitors 10, 15, as well as 16 read-out transistors (Qr) 20. As noted above, the 4×4 cells 102 includes 4 of the 2×2 array. For, the integrated 2×2 array, each unit cell of hold and sample capacitors 10, 15 has its own multiplexer 25, e.g., each multiplexer 25 having four multiplexer transistors 26 (Qm), and bias transistor 30 (Qb), which is in electrical communication with a 4×4 cell multiplexer 27 (hereafter referred to as 4×4 cell periphery multiplexer), which also has four multiplexer transistors (Qm). In the 8×8 cell, there are 4 of the 4×4 cell periphery multiplexers 27 that are in electrical communication with an 8×8 cell periphery multiplexer 28. The 8×8 cell periphery multiplexer 28 includes four multiplexer transistors. The 8×8 cell periphery multiplexer 28 is in electric electrical communication with the single output of the 4×4 cell periphery multiplexers 27. The 4×4 cell periphery multiplexers 27 which also include four multiplexer transistors are in electrical communication with the multiplexer for the 2×2 cell.

The 16×16 cell 104 includes 4 of the 8×8 cells 103, which results in 64 unit cells of the hold and sample capacitors 10, 15, as well as 32 read-out transistors (Qr) 20. As noted above, the 8×8 cells 103 includes 4 of the 4×4 array 102, and the 4×4 cells 102 includes 4 of the 2×2 array. Similar to the 8×8 cell 103, and the 4×4 cell 102, the 16×16 cell includes a 16×16 cell periphery multiplexer 29 that includes four multiplexer transistors. The 16×16 cell periphery multiplexer 29 is in electric electrical communication with the single output of each of the 8×8 cell periphery multiplexer 28 that is in electrical communication with the single output of the 4×4 cell periphery multiplexers 27. The 4×4 cell periphery multiplexers 27 which also include four multiplexer transistors are in electrical communication with the multiplexer 25 for the 2×2 cell.

FIG. 2 illustrates the fractal nature of the double-binary distribution tree to provide access to the whole array with logarithmic spacer penalty of the size of the array.

FIG. 5 is a circuit diagram illustrating one embodiment of a read critical path operation in a fractal analog random access memory device. Readout and charge accumulation in sampling capacitors can be done simultaneously. The cell includes a sampling capacitor (Cs) 10. The read out voltage ($V_s$) can be read from the cell through the read out transistor ($Q_R$) 20. In some embodiments, the read out transistor ($Q_R$) is in electrical communication with the transistors of the multiplexer ($Q_M$). This multiplexer may be represented by reference number 25, and the multiplexer 25 may include bias transistor ($Q_B$). A plurality of multiplexer transistors ($Q_B$) are depicted. The voltage drop across the multiplexer transistors ($Q_M$) is negligible because the current is approximately zero. A high logic voltage (VH) can be measured from the multiplexer transistors ($Q_B$) 26 of the multiplexer 25.

Following the multiplexer is an operational amp 7. The single output of the op amp 7 is to a read out transistor ($Q_R$'). The read out 23 from the op amp 7' is $V_S$'. The bias voltage 21 is $V_B$. The positive connection input of the op amp 7 is to the multiplexer 25. The negative connection input of the op amp 7 is to offset compensation circuit 13. The compensation circuit 13 includes a multiplexer transistor ($Q_M$') 14 and bias transistor ($Q_B$') 16. The high logic voltage 22 is VH.

In some embodiments, the read out transistor ($Q_R$') from the op amp 7, the multiplexer transistor ($Q_M$') 14 and the bias transistor ($Q_B$') 16 of the compensation circuit balance the voltage drop due to the read out transistor ($Q_R$) 20, the multiplexer transistors ($Q_M$) of the multiplexer 25 and the bias transistor ($Q_B$) of the multiplexer 25, so that the read out voltage (Vs') from the op amp 7 is approximate to the read out of the unit cell ($V_S$).

In some embodiments, the simple readout/bias circuit provides voltage readout and propagation without a loss of the sampled charge. Analog multiplexers 25, 27, 28, 29 and digital control circuitry 8 provide random access capability. The bias circuit which may be shared among a group of 1, 4, 16, or more unit cells. The circuit is only activated when a member of the group is addressed. This minimizes the DC power consumed by the bias circuit.

Figure 6:
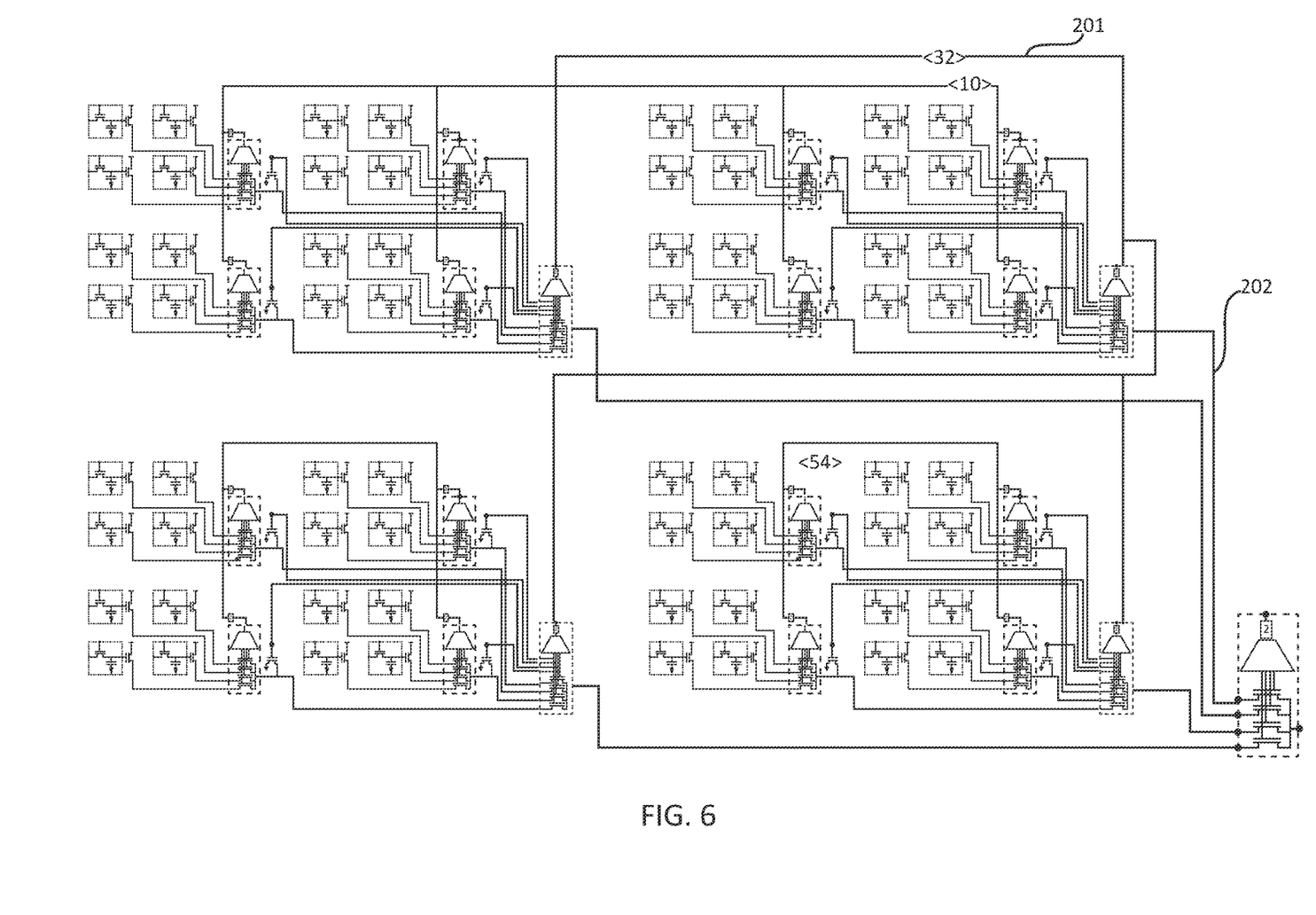
FIG. 6 is a circuit diagram illustrating an example of array scaling, with an example 8×8 unit cell with 2 levels of addressing showing the fractal nature of the analog and digital signal distributions.

FIG. 6 illustrates an example of array scaling, with an example 8×8 unit cell with 2 levels of addressing showing the fractal nature of the analog and digital signal distributions. The lines identified by reference number 201 are the digital signal distributions, and the lines identified by reference number 202 are the analog signal distributions. It is noted that in the example depicted in the supplied figures, the multiplexer units (MPX) 25, 27, 28, 29 have the same size, even through some scaling may be present in the figures that was performed for the purposes of illustrative clarity.

Array scaling can have an array size of N×N with a unit cell size of a. The multiplex (MPX) size is b. The number of multiplexers (MPX) 25, 27, 28, 29 may be equal to: N×N/2. The maximum analog wire length is equal to N(2a+b). The total length is equal to N(2a+b/2)=2 wiring channel per row/column. The total length of all digital wires may be equal to $N^2(a+b/2)$.

The array digital latency may be equal to: $\tau_{Dx} \times \log_2 N$

The MPX digital latency is $\tau_{Dx}$.

The array analog latency may be equal to $(r_{cell}+r_x+\log_2 N) \times c_x \log_2 N$.

The MPX resistance is $r_x$.

The MPX capacitance is $c_x$.

The unit cell readout resistance is r cell.

Figure 7:
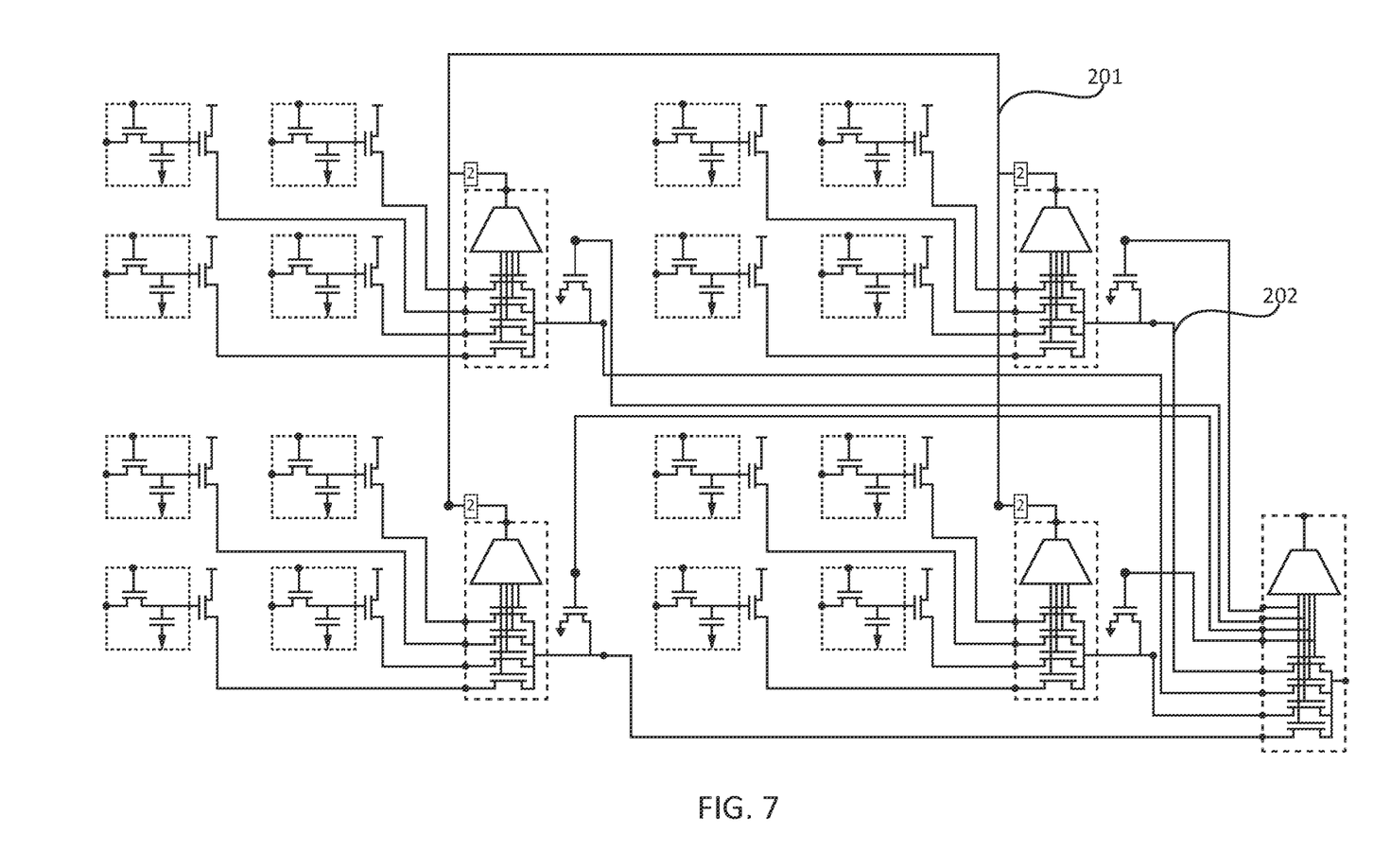
FIG. 7 is a circuit diagram illustrating 4×4 unit cells showing logic for bias transistors, in accordance with one embodiment off the present disclosure.
Figure 8:
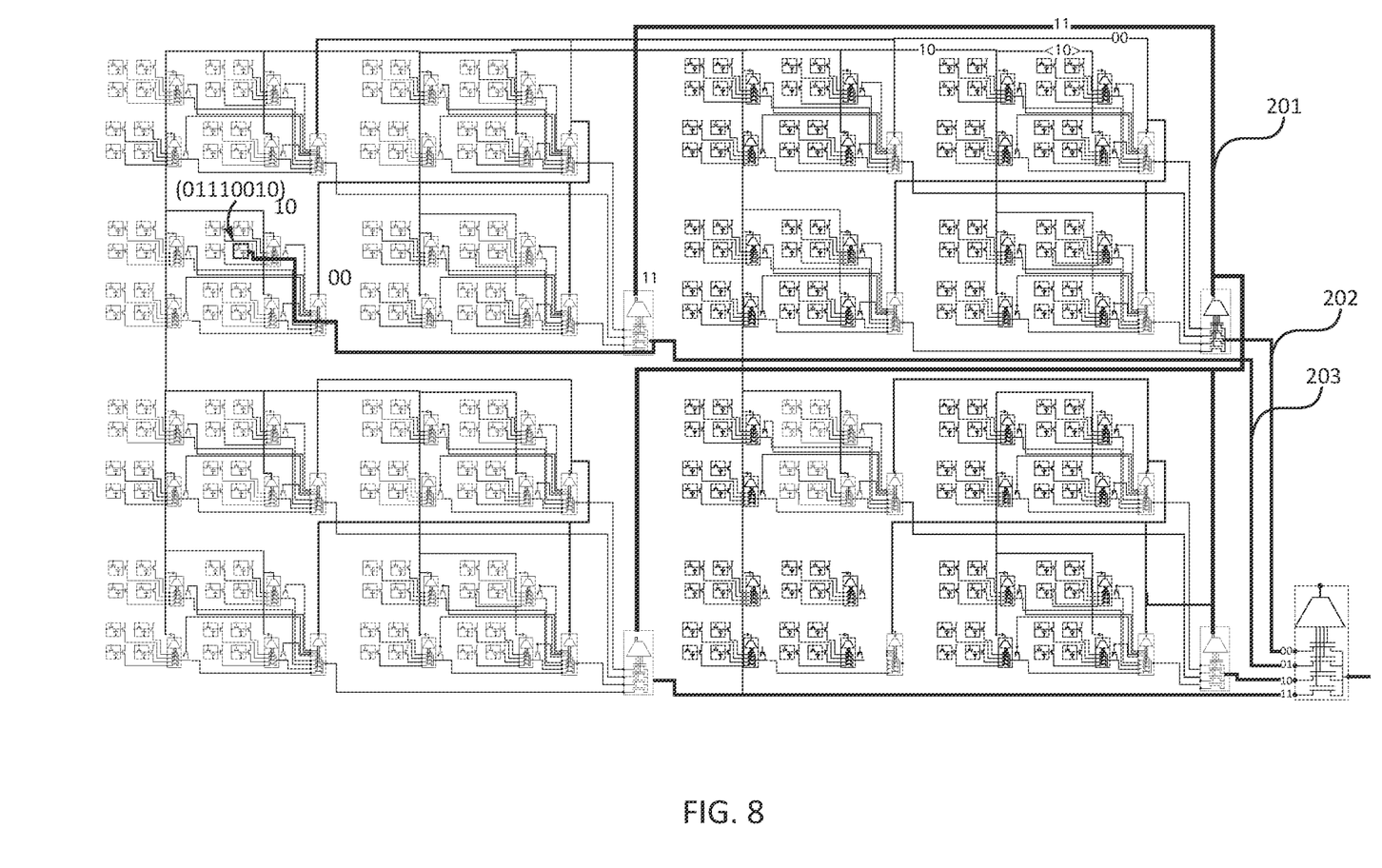
FIG. 8 is a circuit diagram illustrating 16×16 unit cells illustrating random access addressing of cell (01110010), in accordance with one embodiment of the present disclosure.

FIG. 7 is a circuit diagram illustrating 4×4 unit cells showing logic for bias transistors, in accordance with one embodiment off the present disclosure. The lines identified by reference number 201 are the digital signal distributions. The lines identified by reference number 202 are the analog signal distributions. It is noted that in the example depicted in the supplied figures, the multiplexer units (MPX) have extra taps to drive the bias transistors FIG. 8 is a circuit diagram illustrating 16×16 unit cells illustrating random access addressing of cell (01110010). The lines identified by reference number 201 are the digital signal distributions. The lines identified by reference number 202 are the analog signal distributions. The lines identified by reference number 203 illustrate addressing of cell (01110010).

It is to be understood that aspects of the present invention will be described in terms of a given illustrative architecture; however, other architectures, structures, substrate materials and process features and steps can be varied within the scope of aspects of the present invention.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an integrated circuit chip, which can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer can transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Having described preferred embodiments of the fractal analog random access memory disclosed herein (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A memory device comprising:
   a plurality of memory cells, each memory cell including a sample capacitor and a hold capacitors in an array geometry;
   a readout transistor in electrical communication with the sample capacitors and hold capacitors of each memory cell;
   a peripheral amplifier; and
   an analog multiplexer that controls digital and analog signals to an array of memory cells to provide for random access of the memory cells, wherein the readout transistor provides a single source follower transistor for each memory cell of the plurality of memory cells to the peripheral amplifier.

2. The memory device of claim 1, wherein the array is a 4×4 array, an 8×8 array or a 16×16 array.

3. The memory device of claim 1 further comprising placement of operational amplifier transistors in one unit cell of a plurality of unit cells.

4. The memory device of claim 1 further comprising placement of operational amplifier transistors in the peripheral amplifier.

5. The memory device of claim 1 further comprising a digital to analog converter in electrical communication with the peripheral amplifier.

6. The memory device of claim 1, wherein the analog multiplexer is a 4:1 multiplexer.

7. The memory device of claim 6, wherein the array is in 2×2 units that increase geometrically in size from unit cells to ¼ of an entire array.

8. The memory device of claim 1, further comprising a bias circuit shared by unit cells of the array.

9. The memory device of claim 8, wherein the bias circuit is activated when a member of the unit cells in the array is addressed.

10. The memory device of claim 1, wherein unit cells in the array are differential with two sample capacitors and two hold capacitors.

11. The memory device of claim 10, wherein each leg of a differential path for the unit cells in the array is independent and includes separate bias networks and multiplexers, wherein the each leg of the differential path share a peripheral amplifier.

12. A memory device comprising:
a plurality of memory cells including sample capacitors and hold capacitors in an array geometry that includes a rational number of subunits (R×C), each subunit having its own peripheral amplifier and analog to digital converter, wherein the array geometry includes R subunits along each row and C subunits along each column in the array geometry, wherein a degree of parallelism allows read throughput to be increased by a factor of R for reading entire rows or C when reading entire columns;
a readout transistor in electrical communication with the sample capacitors and hold capacitors;
a peripheral amplifier; and
an analog multiplexer that controls digital and analog signal to an array of memory cells to provide for random access of the memory cells, wherein the readout transistor provides a single source follower transistor for each memory cell of the plurality of memory cells to the peripheral amplifier.

13. The memory device of claim 12, wherein the array is a 4×4 array, an 8×8 array or a 16×16 array.

14. The memory device of claim 12, wherein the analog multiplexer is a 4:1 multiplexer.

15. The memory device of claim 14, wherein the array is in 2×2 units that increase geometrically in size from unit cells to ¼ of the entire array.

16. The memory device of claim 14, further comprising a bias circuit shared by unit cells of the array.

17. The memory device of claim 16, wherein the bias circuit is activated when a member of the unit cells in the array is addressed.

18. The memory device of claim 1, wherein a unit cells in the array are differential with two sample capacitors and two hold capacitors.

19. The memory device of claim 10, wherein each leg of a differential path for the unit cells in the array is independent and includes separate bias networks and multiplexers, wherein each leg of the differential path share a peripheral amplifier.

20. A memory device comprising:
a plurality of memory cells including unit cells in an array geometry, wherein the unit cells in an array are differential with two sample capacitors and two hold capacitors;
a readout transistor in electrical communication with the two sample capacitors and the two hold capacitors, wherein a single readout transistor is coupled to one sample capacitor and one hold capacitor;
a peripheral amplifier; and
an analog multiplexer that controls digital and analog signals to the array of memory cells to provide for random access of the memory cells, wherein each readout transistor provides a single source follower transistor for each memory cell of the plurality of memory cells to the peripheral amplifier.

* * * * *